April 16, 1940. E. S. CORNELL, JR 2,197,609
METHOD OF MANUFACTURING PRESSURE VESSELS OR THE LIKE
Filed June 23, 1937
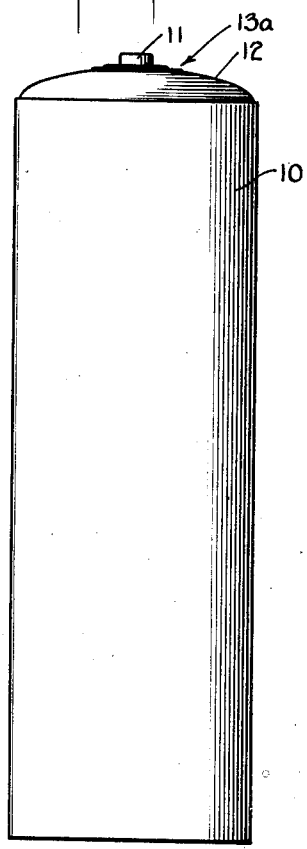
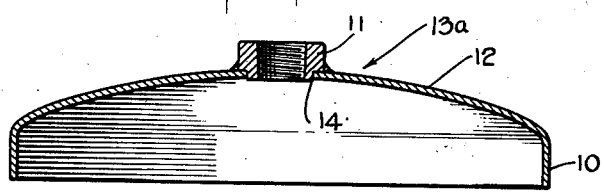
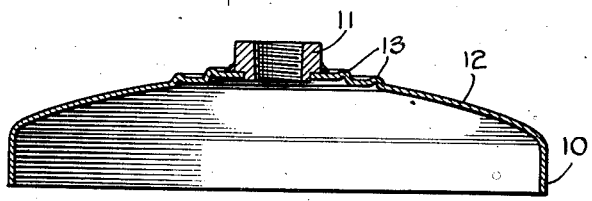
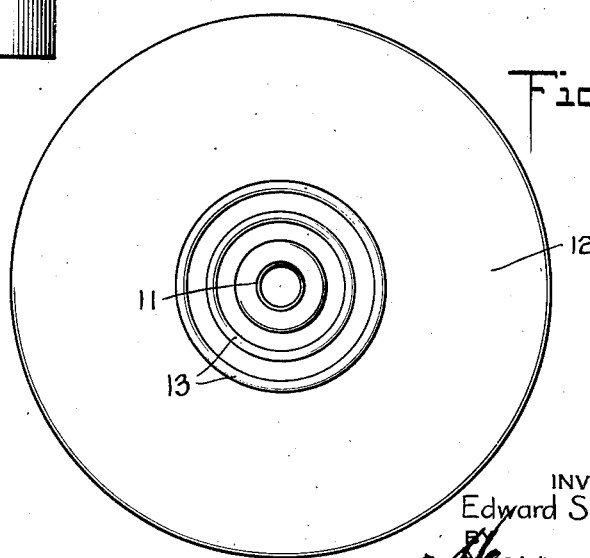
INVENTOR
Edward S. Cornell, Jr.
HIS ATTORNEY Patented Apr. 16, 1940

2,197,609

UNITED STATES PATENT OFFICE 2,197,609

METHOD OF MANUFACTURING PRESSURE VESSELS OR THE LIKE

Edward S. Cornell, Jr., Larchmont, N. Y., assignor, by mesne assignments, to American Radiator & Standard Sanitary Corporation, New York, N. Y., a corporation of Delaware Application June 23, 1937, Serial No. 149,807

3 Claims. (Cl. 29—148.2)

This invention relates to a method of manufacturing tanks or the like, equipped with spuds or like appurtenant devices, secured to the material of the tank by welding, brazing or like heat-involving operation.

More particularly, my invention is directed to pressure-vessels, such as range-boilers, tanks, containers, and other structures of hollow formation provided with passage-affording devices such as spuds, or other type of appurtenant devices secured in an opening of the material of such structures by welding, brazing or like heat-involving treatment, the material being metallic, such as my copper-silicon-iron-phosphorus alloy, described and claimed in my U. S. Patent No. 2,017,025, granted October 8, 1935. Under such heat-involving treatment, the structure of the material at and adjacent the area of welding, brazing, or the like, undergoes physical change to more or less extent, resulting in the formation of a localized area of inferior tensile strength, as compared with those surfaces which have not been exposed to the elevated temperatures.

Pursuant to my invention, such area is subsequently subjected to cold working processes of scope and duration suitable to restore or increase the tensile strength and rupture-resisting strength of the area, and thus again to make the strength of the tank-head or other spud-receiving element substantially uniform throughout its extent. Advantageously, the cold working is effected by suitable die operations which additionally and incidentally impart a configuration at the cold-worked area which per se increases the flexural and shock-absorbing properties thereof, and thus adds to the rupture-resisting properties of the structure.

An advantage resulting from the practice of my invention lies in the practicability of using lighter materials by reason of the restoration of strength to the heat treated part and the resulting freedom from dependence upon sheer thickness of material to compensate for the impairment of strength. As my invention is particularly applicable to the manufacture of objects of vast domestic and commercial usage, such as storage tanks, range boilers, water heaters, and other structures which are subjected to moderately high internal pressures resulting from heating a confined body of fluid, it is obvious that the saving in material cost and weight may be appreciable.

Further features and objects of the invention will be more fully understood from the following detail description and the accompanying drawing, in which:

Fig. 1 is a side elevation of a tank equipped with a spud, the connection of the spud with the material of the tank being made pursuant to the present invention.

Fig. 2 is a detail vertical section on a somewhat enlarged scale of the tank head of Fig. 1, at a stage preliminary to carrying out the present invention.

Fig. 3 is a vertical section, similar to Fig. 2, but showing one manner of connection pursuant to the present invention.

Fig. 4 is a plan view of Fig. 3.

As above indicated, my improved method of manufacture is applicable to the fabrication of structures such as tanks, pressure vessels, and other mechanical structures subjected to mechanical stresses in use, and to which structures are welded appurtenances forming points of connection of external apparatus or elements. Particularly, the improved method of manufacture comprises the cold-working of the wall of the structure adjacent the welded joint to offset the annealing or softening effect incident to the subjection of the structure to welding temperature, and thus to restore to such structural area physical properties such as hardness and tensile strength.

Accordingly, the illustrated embodiment of my invention applied to one spud at the head of a tank is representative generally of a wide scope of variant types of embodiments of the present invention.

Referring to Figs. 1, 3 and 4, the tank 10 may be of any suitable material, usually metal; commercial embodiments of the present invention have been applied to tanks of the copper-silicon-iron-phosphorus alloy set forth and claimed in my U. S. Patent No. 2,017,025, granted October 8, 1935. In the instance illustrated in Figs. 1, 3 and 4, a spud 11 is shown secured to the material of the head 12 of the tank, as by welding. The portion, designated generally 13a, see Fig. 1, of the material of the head 12, which has been subjected to welding temperature and the portion adjacent thereto to elevated temperature, has been cold worked by suitable treatment, to restore or otherwise impart increased strength, primarily increased tensile strength and increased strength against rupture.

As one manner of carrying out the invention, reference is now made to Fig. 2, wherein is illustrated a suitable opening 14, formed by punching or equivalent operation. The spud 11 or equivalent is placed within such opening 14, whereafter the area 13a of the material of the head 12 and the material of the side walls of the spud are subjected to welding temperature to weld the same to one another. The spud 11 is preferably of the same material as that of the tank 10, such as the copper-silicon-iron-phosphorus alloy aforesaid. The material of the spud 11 may, however, be of any suitable material, usually metal, capable of being welded to the material of the tank.

If desired, the securement of the spud 11 to the material of the head 12, may be effected by brazing or the like.

By such or equivalent heat treatment of the area 13a of the material of the head 12, the structure of the metal undergoes a physical change, with a resulting loss of "hardness", that is, a loss of tensile strength and an increase in ductility. As indicated in Figure 2, the heat worked area 13a may comprise only a fraction of the entire area of the tank head 12, and there is thus created a structurally unsound condition in which an element intended to be subjected to substantially uniform internal pressures throughout is not uniform in tensile or rupture-resisting strength. The mere substitution of generally heavier materials for the tank head 12, to compensate for the loss of strength, does not achieve the desired result of strength uniformity, and is uneconomic.

Pursuant to the present invention, such area is subjected to cold working, as by means of suitable complementary dies brought into forceful contact with the stated area on opposed faces. Advantageously, such cold-working die operation imparts an "embossed" configuration, such as the illustrated concentric corrugations 13, Fig. 3. By suitably regulating the duration and extent of the cold working operation in accordance with established principles, the tensile strength and the rupture-resisting strength of the treated area may be restored to such extent that the treated area possesses tensile and rupture-resisting qualities comparable to the untreated areas of the material of the tank, and in particular, to the untreated area of the tank head 12.

The corrugated configuration, per se, improves the qualities of the structure as a pressure-resisting vessel by increasing the flexibility of the structure in the area adjacent the spud-connection 11, thereby providing means for absorbing, or minimizing the effects of, axial or laterally imposed stresses resulting from the expansion or contraction, or sidewise movement of the piping (not shown) for connection to which the spud 11 is intended.

Whereas I have described my invention by reference to specific forms thereof, it will be understood that many changes and modifications may be made without departing from the spirit of the invention.

I claim:

1. The method of manufacturing metallic structures having an appurtenance secured thereto, which includes the steps of welding said appurtenance to a wall of said structure, permitting said wall structure to cool, and cold-working the said wall structure in an area surrounding the welded appurtenance by mechanical die operations to increase the hardness of the said area, said mechanical die operations forming a plurality of corrugations concentric about said appurtenance.

2. In the manufacture of metallic structures, the method of securement of an appurtenance to an element thereof, comprising welding the said appurtenance to the said element, permitting the element to cool, and subsequently mechanically deforming an area of said element adjacent to said welded appurtenance to harden the said element in the said area.

3. The method of securement of an appurtenant device to a metallic structure, which comprises the steps of welding said appurtenant device to said structure, permitting the welded joint and the wall area of the vessel adjacent said welded joint to cool, and cold-working that portion of the wall area which was subjected to elevated temperature during the welding operation to strain-harden such wall area.

EDWARD S. CORNELL, Jr.